April 23, 1940.  C. P. HAMILTON  2,198,477
CONTROL SYSTEM
Filed Nov. 23, 1938
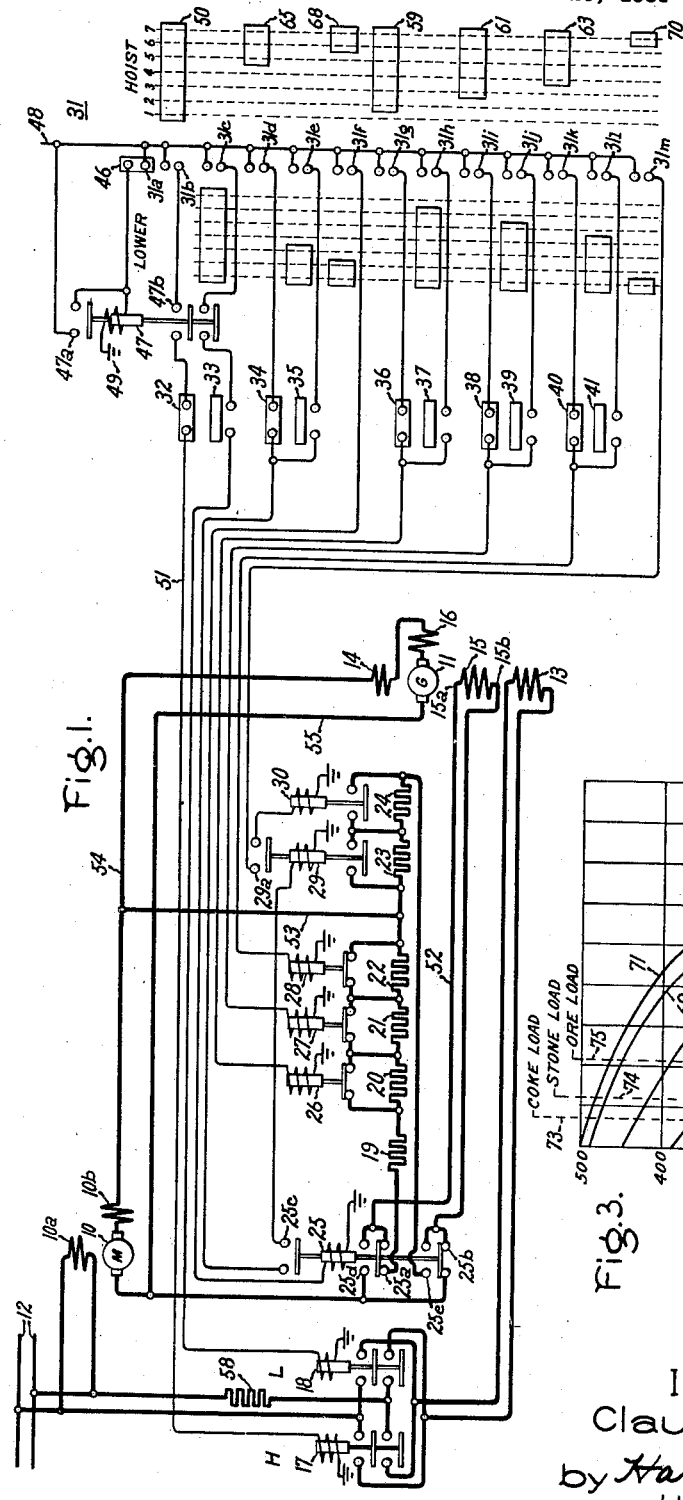
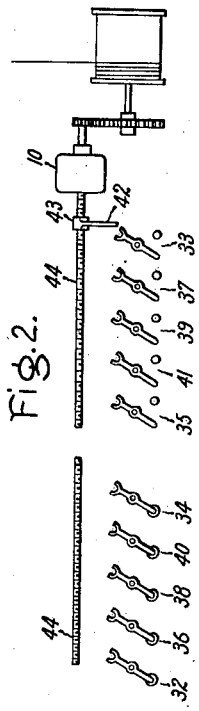
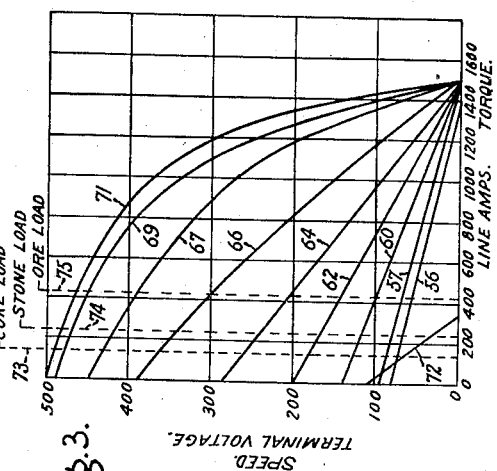
Inventor:
Claude P. Hamilton,
by Harry E. Dunham
His Attorney.

Patented Apr. 23, 1940

2,198,477

UNITED STATES PATENT OFFICE 2,198,477

CONTROL SYSTEM

Claude P. Hamilton, Schenectady, N. Y., assignor to General Electric Company, a corporation of New York Application November 23, 1938, Serial No. 242,014

14 Claims. (Cl. 172—239)

This invention relates to control systems, more particularly to systems for controlling the operations of electric motors, and it has for an object the provision of a simple, reliable, and improved control system of this character.

Still more specifically the invention relates to motor control systems in which the motor is supplied from a variable voltage generator which has the characteristic of automatically limiting the current output and consequently the torque of the motor to definite values. In a system of this character, the voltage of the generator and the speed of the motor change rapidly with load, with a resultant tendency toward instability. The change of speed with load is greater at low speeds than at high speeds. At low crawling speeds, a relatively small change in load will produce a relatively large change in speed.

For many applications, such a characteristic has value. It is unsuited, however, for other applications in which it is desired to move loads of widely varying value at substantially the same speed and particularly at a low speed. A blast furnace skip hoist, for example, dumps successive loads of coke, limestone, and ore into a bell which rotates at constant speed. The limestone load may be 150% of the coke load, and the ore load may be 300% of the coke load.

In order to obtain the most satisfactory results from the operation of the blast furnace, uniform circumferential distribution of each of these separate loads in the bell is essential. To obtain this uniform distribution of these different loads, it is necessary that the hoist shall move through the dumping zone at substantially the same speed for each of these loads of widely varying values. This requisite is clearly inconsistent with a characteristic in which the speed changes rapidly with changes in load. Accordingly, a further object of this invention is the provision of means for controlling the supply generator to produce a reasonably constant voltage of the generator and consequently, a reasonably constant speed of the motor over the load range when operating at low speeds, while retaining the feature of automatically limiting the maximum torque of the motor to a predetermined value.

In carrying the invention into effect in one form thereof, a driving motor is supplied from a variable voltage generator that is provided with a separately excited field winding, a differential series field winding, and a self-excited shunt field winding. For the low speed operations of the motor, the self-excited shunt field winding of the generator is connected to be subtractive with respect to the separately excited shunt field winding, and means responsive to a predetermined amount of operation of the motor are provided for varying the strength of the self-excited shunt field.

One aspect of the invention is a control system for skip hoists and the like in which a master switch and switching means responsive to the operation of the master switch are provided for controlling separately the polarity and strength of the self-excited shunt field and separately excited shunt field, together with limit switch mechanism for controlling the polarity and strength of the shunt fields as the hoist approaches the stopping point, thereby to produce a low crawling speed that is substantially constant for different values of load.

In illustrating the invention in one form thereof, it is shown as embodied in a control system that is particularly adapted for the control of skip hoists and the like. It is to be understood, however, that the invention is not limited to a skip hoist control system.

For a better and more complete understanding of the invention, reference should now be had to the following specification and to the accompanying drawing in which Fig. 1 is a simple, diagrammatical representation of an embodiment of the invention, Fig. 2 is a simple, diagrammatical sketch of details of the invention that have utility in the aspect of the invention relating to skip hoist control systems, and Fig. 3 is a chart of characteristic curves of operating conditions of the system that serve to explain the operation of the system itself.

Referring now to the drawing, the motor 10 is connected to drive a load, such for example, as the bucket of a blast furnace skip hoist. The armature of the motor 10 is connected in a loop circuit with the armature of a variable voltage generator 11 which is driven by any suitable driving means, such for example, as an alternating current induction motor (not shown) supplied from a suitable source (not shown).

Hoist motor 10 is provided with a shunt field winding 10a supplied from a suitable source represented by the two supply lines 12, and is also provided with a commutating field winding 10b.

The generator 11 is provided with a separately excited shunt field winding 13, a differential series field winding 14, a separately excited shunt field winding 15, and a commutating field winding 16.

Suitable reversing switching means illustrated as a pair of electromagnetic contactors 17 and 18 are provided for connecting the separately excited shunt field winding 13 to the source 12. This shunt field of the generator 11 is the main field and serves to determine the polarity of the generator voltage and thereby to determine the direction of rotation of the hoist motor 10. In this connection it may be assumed that when the contactor 17 is closed, the generator voltage will be of such a polarity as to cause the motor 10 to hoist the bucket, and conversely, when the contactor 18 is closed, the generator voltage will be of such a polarity as to cause the motor 10 to lower the bucket.

For the purpose of controlling the strength of the self-excited shunt field of the generator 11, a plurality of resistors 19, 20, 21, 22, 23, and 24 are arranged to be connected in circuit with the shunt field winding 15 under certain conditions and to be short-circuited or disconnected from the circuit of the shunt field winding under certain other conditions.

The self-excited shunt field may be controlled to boost or to buck the separately excited shunt field by means of suitable switching mechanism illustrated as an electro-magnetic contactor 25 included in the connections of the self-excited shunt field winding 15.

Suitable means illustrated as a plurality of electromagnetic contactors 26, 27, 28, 29, and 30 are provided for controlling resistors 20, 21, 22, 23, and 24 respectively, thereby to control the strength of the self-excited shunt field.

The opening and closing operations of contactors 17, 18, and 25 to 30 inclusive are controlled by a suitable control device illustrated as a multi-position, reversing type master switch 31, and are also controlled by a suitable limit switch mechanism illustrated as a plurality of limit switches 32, 33, 34, 35, 36, 37, 38, 39, 40, and 41 which are included in the connections between the master switch and the operating coils of the contactors. Although the master switch 31 may be of any suitable type, it is illustrated as a drum type master switch having seven hoisting control positions, seven lowering control positions, and a central or "off" position in which it is illustrated.

The limit switch mechanism may be of any suitable type such as a geared type limit switch. It is illustrated, however, as comprising a plurality of movable switch contacts which are actuated from the open to the closed position or from the closed to the open position by means of a dog 42 on a nut 43 which travels along a threaded screw 44 as the hoist motor 10 rotates. The limit switch mechanism is so arranged that limit switches 32, 34, 36, 38, and 40 are closed and limit switches 33, 35, 37, 39, and 41 are open when the bucket is at the bottom of its travel.

In describing the operation of the system, reference will be made to the chart of characteristic curves in Fig. 3 in which ordinates represent terminal voltage of the generator 11 and abscissae represent amperes. Since the speed-torque characteristic curves of the motor 10 are generally similar to the volt-ampere characteristic curves of the generator 11, ordinates may also be assumed to represent motor speed and abscissae may be assumed to represent motor torque. Typical values of ampere load or motor torque for coke, limestone, and ore loads are represented by the dotted vertical lines A, B, C.

With the foregoing understanding of the elements and their organization in the completed system, the operation of the system itself will readily be understood from the following detailed description.

In the central or "off" position of the master switch the segment 46 bridges fingers 31a to complete an energizing circuit for the operating coil of undervoltage contactor 47 that is readily traced from the side 48 of a supply source to the opposite side of the source represented by the ground symbol 49. Contactor 47 closes in response to energization and seals itself in through interlock contacts 47a.

Assume that a loaded bucket is at the bottom of the incline and that it is desired to hoist the loaded bucket to the dumping position at the top of the incline, the master switch 31 is operated to its first right-hand position in which it completes an energizing circuit for the operating coil of the hoisting contactor 17. This energizing circuit is traced from the power conductor 48 through fingers 31b bridged by segment 50, contacts 47b of undervoltage relay 47 (in the closed position thereof), limit switch 32, conductor 51, operating coil of contactor 17 to the opposite side of the supply source. Contactor 17 closes in response to energization and connects the separately excited shunt field winding 13 to the supply source 12 for excitation in such a direction that the polarity of the voltage of the generator 11 will cause motor 10 to rotate in a direction to hoist the bucket. On this same position of the master switch, contactor 25 is deenergized and its main contacts are in their lower positions in which they connect the self-excited shunt field winding 15 of the generator to the armature terminals for excitation in such a direction that the self-excited shunt field is subtractive with respect to the separately excited shunt field. The circuit of the self-excited shunt field winding 15 is traced from the upper terminal 15a through conductor 52, contacts 25a of contactor 25, resistor 19, resistors 20, 21, and 22 (short-circuited by the contactors 26, 27, and 28), conductor 53, conductor 54, field windings 14 and 16, armature of generator 11, conductor 55, and contacts 25b of contactor 25 and lower terminal 15b of the field winding 15. As a result of the bucking polarity of the self-excited shunt field, the volt-ampere operating characteristic of the generator and the speed torque operating characteristic of motor 10 are in accordance with curves 56 or 57 depending upon the resistance values of resistors 19 and 58. It will be noted that the characteristic curves 56 and 57 are reasonably "flat" curves and that the voltage of the generator and the speed of the motor remain reasonably constant for fairly large changes in load.

With the master switch in the first position, the motor 10 will accelerate the bucket to a low speed.

Moving the master switch to the right-hand position causes the segment 59 to bridge fingers 31g to complete an energizing circuit through limit switch 36 for the operating coil of contactor 26. Contactor 26 opens its contacts in response to energization and inserts resistor 20 in the circuit of the self-excited shunt field winding 15, thereby weakening its bucking effect so that the operating characteristics of generator 11 and motor 10 are in accordance with curve 60. As a result of this, the generator voltage and also the speed of the motor rise to a second predetermined value, with the maximum stalling current remaining at substantially the same value as when the master switch was in the first position and the generator and motor were operating in accordance with characteristic curves 56 and 57.

On the third point of the master switch, segment 61 bridges fingers 31h to complete an energizing circuit through limit switch 38 for the operating coil of contactor 27. In response to energization contactor 27 opens its contacts to insert resistor 21 in the circuit of self-excited shunt field winding 15, thereby further weakening the bucking effect of the self-excited shunt field so that the operation of generator 11 and motor 10 are in accordance with curve 62. As a result the speed of motor 10 rises to a higher predetermined value but the maximum stalling current remains the same as previously.

On the fourth point of the master switch, segment 63 bridges fingers 31k to energize contactor 28 which opens its contacts to insert resistor 22 in the self-excited field winding circuit with the result that the operation of the generator 11 and motor 10 are now in accordance with curve 64. The speed of motor 10 rises to a new predetermined value but the stalling current remains substantially the same as previously.

Moving the master switch 31 to its fifth right-hand position completes an energizing circuit for the operating coil of reversing contactor 25 through limit switch 34. Contactor 25 is operated to its upper closed position in response to energization in which it first disconnects the self-excited shunt field winding 15 from the armature terminals of the generator 11 and subsequently reconnects the self-excited shunt field winding 15 to the armature terminals of the generator for additive polarity with respect to the separately excited shunt field and with the resistors 23 and 24 included in the circuit so that the strength of the self-excited shunt field is reduced to a low value. The circuit for the shunt field winding as reconnected is traced from the upper terminal 15a through conductor 52, upper contacts 25d of contactor 25, conductor 55, armature and field windings 16 and 14 of generator 11, conductors 54 and 53, resistors 23 and 24, contacts 25a to the lower terminal 15b of the shunt field winding. During the interval that the self-excited shunt field winding is disconnected from the armature terminals of the generator, the operations of the generator 11 and motor 10 are in accordance with curve 66. As a result, the speed of the motor rises to a still higher predetermined value but the stalling current remains the same as before.

When contactor 25 closes its upper main contacts to reconnect the self-excited shunt field winding for additive polarity, the operations of the generator and the motor are in accordance with curve 67. In consequence, the speed of the motor rises to a still higher predetermined value. The stalling current remains substantially the same as when the system was operating on the first four points of the master switch. Movement of the master switch to its sixth hoisting position causes segment 68 to bridge fingers 31l to complete an energizing circuit for the operating coil of contactor 29 through the upper interlocks 25c of contactor 25 in the closed position thereof. Contactor 29 closes in response to energization and short-circuits resistor 23, thereby strengthening the self-excited shunt field so that operations of the generator and motor are in accordance with curve 69. As a result the speed of motor 10 is accelerated to a still higher predetermined value with the stalling current remaining the same as before.

On the seventh point hoisting of the master switch, segment 70 bridges fingers 31m to complete an energizing circuit for the operating coil of contactor 30 through interlocks 29a of contactor 29 in the closed position thereof. Contactor 30 closes in response to energization and short-circuits resistor 24, thereby further to increase the strength of the shunt field so that further operation of the generator and motor is in accordance with characteristic curve 71. The motor accelerates to a maximum predetermined speed and the stalling current remains the same as previously.

It will be noted that the speed regulation of the motor when operating at low speeds in accordance with characteristic curves 56, 57, 60, and 62 is reasonably constant over the load range, i. e., the change of speed with load is relatively small. On the other hand, it will be noted that if low speeds were to be obtained by weakening the separately excited shunt field of generator 11, the operation of the generator and motor would be in accordance with curve 72. The speed regulation when operating in accordance with characteristic curve 72 is inferior to the speed regulation when operating on characteristic curves 56, 57, 60, and 62 because a relatively small change in load produces a relatively large change in speed and the system thus tends toward instability.

As the motor 10 accelerates the hoist bucket 20 from low speed to its maximum high speed value, the dog 42 of the traveling nut 43 successively engages limit switches 33, 37, 39, 41, and 35 and closes these limit switches in the order named.

When operating at maximum speed, the bucket is hoisted rapidly up the incline toward the dumping knuckles which tip the bucket to a position in which it dumps its load into the rotating hopper.

As the bucket nears the upper end of its travel, the dog 42 opens limit switch 34, thereby deenergizing contactor 25 which opens in response to deenergization and deenergizes contactors 29 and 30. In response to deenergization, contactors 29 and 30 open to remove the short circuit about resistors 23 and 24, but the opening of these two contactors is without consequence at this point because contactor 25 after opening in response to deenergization closes its lower main contacts 25a and 25b to reverse the self-excited shunt field winding so that the self-excited shunt field is again subtractive with respect to the separately excited shunt field. When this reversal of the connections of the self-excited shunt field winding takes place, resistors 20, 21, and 22 are included in the connections, and accordingly, the strength of the self-excited shunt field is weakened to a low value. As a result, the operation is in accordance with the characteristic represented by the curve 64, and the speed of the motor is reduced to a predetermined value.

As the travel of the bucket continues, limit switches 40, 38, 36, and 32 are successively opened in the order named. Limit switches 40 and 38 are opened before the bucket reaches the dumping knuckles, limit switch 36 is opened approximately when the bucket reaches the dumping knuckles, and limit switch 32 is opened when the bucket has reached its final tilted position on the dumping knuckles.

The opening of limit switch 40 results in deenergizing contactor 28 which thereupon closes to short-circuit resistor 22. This results in strengthening the self-excited shunt field and increasing its bucking effect so that further operation is at a predetermined low speed in accordance with the characteristic represented by curve 62.

Opening of limit switch 38 deenergizes contactor 27 which closes to short-circuit resistor 21 with the result of further decreasing the speed so that operation as the bucket approaches the dumping knuckles is at a still further reduced speed in accordance with the characteristic represented by curve 60.

When limit switch 36 is opened just as the bucket reaches the dumping knuckles, resistor 20 is short-circuited thereby further to strengthen the bucking effect of the self-excited shunt field and to effect reduction of the motor speed to a predetermined low value in accordance with curves 57 or 56 (depending upon the resistance values of resistors 19 and 58).

It will be noted that when operating in accordance with characteristics represented by curves 57 or 56, the speed regulation is very good, i. e., a very large change in load results in a relatively small change in speed. In other words, the speed of the motor remains reasonably constant over the load range. Thus, irrespectively of whether the bucket is carrying a coke load, limestone load, or ore load, its dumping speed is substantially the same in each case during the time that it is passing over the dumping knuckles. Consequently, a very good circumferential distribution of load in the rotating bell is obtained.

The opening of limit switch 32, which occurs when the bucket reaches its final position at the top of the incline, deenergizes the hoist contactor 17 which thereupon opens to disconnect the separately excited shunt field winding 13 from the source 12. This results in rapidly reducing the voltage of the generator 11 and the speed of the motor 10 which is further aided by the "suicide" connection of the self-excited shunt field, i. e., the connection of the self-excited shunt field winding for subtractive polarity. As a result, the motor 10 and the bucket are brought rapidly to rest.

The lowering of the empty bucket is accomplished in response to actuation of the master switch 31 to the left-hand or "lowering" position. The lowering operation is substantially identical with the hoisting operation with the exception that the limit switches 32, 36, 38, 40, and 34 are closed in the order named to prepare them for the next actuation to decelerate the motor and bucket at the end of the next succeeding hoisting operation, and the limit switches 35, 41, 39, 37, and 33 are opened in the order named to effect automatic slowdown and stopping as the bucket approaches the stopping point in the lowering direction.

It will be understood that in actual practice, two buckets may be roped to the same winding drum so that an empty bucket is lowered as a loaded bucket is being hoisted. But irrespective, however, of whether one or two buckets are utilized, the operation of the control system is the same as described in the foregoing.

Although in accordance with the provisions of the Patent Statutes this invention is described as embodied in concrete form and its principle has been explained, together with the best mode in which it is now contemplated applying that principle, it will be understood that the apparatus and connections shown and described are merely illustrative and that the invention is not limited thereto, since alterations and modifications will readily suggest themselves to persons skilled in the art without departing from the true spirit of this invention or from the scope of the annexed claims.

What I claim as new and desire to secure by Letters Patent of the United States is:

1. A control system comprising in combination, a variable voltage generator provided with a separately excited field winding, a differential series field winding and a self-excited shunt field winding connected to be subtractive with respect to said separately excited field winding, an electric motor supplied from said generator, and means responsive to operation of said motor for varying the strength of the self-excited shunt field to vary the speed of said motor.

2. A control system comprising in combination, a variable voltage generator provided with a separately excited field winding, a differential series field winding and a self-excited shunt field winding, an electric motor supplied from said generator, and means responsive to operation of said motor for reversing the connections of said shunt field winding to reverse the polarity of the shunt field and for varying the strength of the shunt field to control the speed of said motor.

3. A control system comprising in combination, a variable voltage generator provided with a separately excited field winding, a differential series field winding and a self-excited shunt field winding connected to be subtractive with respect to said separately excited field winding, an electric motor supplied from said generator, and limit switch mechanism actuated by said motor for strengthening the shunt field to decelerate said motor.

4. A control system comprising in combination, a variable voltage generator provided with a separately excited field winding, a differential series field winding and a self-excited shunt field winding, a reversing switch for said shunt field winding, an electric motor supplied from said generator, and limit switch mechanism responsive to operation of said motor for actuating said reversing switch to connect said shunt field winding to be subtractive with respect to said separately excited field winding and for strengthening the shunt field to decelerate said motor.

5. A control system comprising in combination, a variable voltage generator provided with a separately excited field winding, a differential series field winding and a self-excited shunt field winding, an electric motor supplied from said generator, means for varying the strength of the shunt field to vary the speed of said motor, and means responsive to operation of said motor for oppositely varying the strength of said shunt field to oppositely vary the speed of said motor.

6. A control system comprising in combination, a variable voltage generator provided with a separately excited field winding, a differential series field winding and a separately excited shunt field winding, an electric motor supplied from said generator, means for controlling said generator to supply different no-load voltages to said motor while maintaining the stalling torque of said motor substantially constant comprising means for connecting said shunt field winding to be subtractive with respect to said separately excited field winding, means for varying the current flowing in said shunt field winding to weaken the shunt field to accelerate said motor, and means responsive to operation of said motor for actuating said current varying means to strengthen said shunt field to decelerate said motor.

7. A control system comprising in combination, a generator provided with a separately excited main field winding, a differential series field winding and a self-excited shunt field winding connected to be subtractive with respect to said main field winding, an electric motor supplied from said generator, means for accelerating said motor comprising means for varying the strength of said shunt field to weaken said shunt field, means for reversing the connections of said shunt field winding and means for subsequently strengthening said shunt field, and means for decelerating said motor comprising means responsive to operation of said motor for weakening said shunt field, actuating said reversing means to connect said shunt field winding to be subtractive with respect to said main field winding and for actuating said field strength varying means to strengthen said shunt field.

8. A control system comprising in combination, a variable voltage generator having a separately excited field winding, a differential series field winding and a self-excited shunt field winding, an electric motor supplied from said generator, reversing switching means for connecting said shunt field winding to be additive with respect to said separately excited field winding, means responsive to operation of said motor for actuating said reversing means to connect said shunt field winding to be subtractive with respect to said separately excited field winding and means for varying the strength of said shunt field thereby to cause the variation of speed of said motor with variation in load to be relatively less than the variation in motor speed for the same variation in motor load when said shunt field winding is connected to be additive with respect to said separately excited field winding.

9. A control system comprising in combination, a variable voltage generator provided with a separately excited field winding and a self-excited shunt field winding connected to be subtractive with respect to said separately excited field winding, an electric motor supplied from said generator, a master switch having an off position and an operating position, and means responsive to operation of said master switch to said operating position for successively weakening the shunt field, reversing the connections of said shunt field winding so that said shunt field is additive with respect to the separately excited field and strengthening said shunt field to accelerate said motor, and limit switch mechanism responsive to operation of said motor for successively weakening said shunt field, reversing said shunt field connections so that said shunt field is subtractive with respect to said separately excited field and strengthening said shunt field to decelerate said motor.

10. A control system comprising in combination, a variable voltage generator provided with a separately excited field winding, a differential series field winding and a self-excited shunt field winding, an electric motor supplied from said generator, means for connecting said shunt field winding to be subtractive with respect to said separately excited field winding, a resistor, means for inserting said resistor in the circuit of said shunt field winding to weaken the shunt field to accelerate said motor, and limit switch mechanism responsive to operation of said motor for rendering said resistor ineffective thereby to strengthen said shunt field and decelerate said motor.

11. A control system for hoists and the like comprising in combination, a variable voltage generator provided with a separately excited field winding, a differential series field winding and a self-excited shunt field winding, an electric motor supplied from said generator, a master switch and a reversing switch controlled thereby for reversing the connections of said shunt field winding to control the polarity of the shunt field and limit switch mechanism for actuating said reversing switch to connect said shunt field winding to be subtractive with respect to said separately excited field winding and for strengthening said shunt field thereby to decrease said generator voltage to decelerate said motor as the hoist approaches a stopping point.

12. A control system comprising in combination, a variable voltage generator provided with a separately excited field winding and a self-excited shunt field winding, an electric motor supplied from said generator, a resistor for the circuit of said shunt field winding, a master switch having an off position and an operating position, means for connecting said shunt winding to be subtractive with respect to said main field winding, means responsive to operation of said master switch from said off position to said operating position for inserting said resistor in said shunt field circuit and reversing the connection of said shunt field to connect said shunt field winding to be additive with respect to said main field winding thereby to increase the voltage of said generator to accelerate said motor and limit switch mechanism actuated by said motor for again reversing said shunt field connections to provide subtractive excitation of said shunt field and short-circuiting said resistor thereby to decrease said generator voltage to decelerate said motor.

13. A control system for hoists and the like comprising a variable voltage generator provided with a separately excited field winding, a differential series field winding and a self-excited shunt field winding, an electric hoist motor supplied from said generator, resistance for the circuit of said shunt field winding, switching means for controlling said resistance, reversing switching means for controlling the connections of said shunt field winding to control the polarity of the shunt field, and a reversing master switch having an off position and operable to an operating position to actuate said resistance, switching means and reversing switching means to control the speed of said motor, and limit switch mechanism for controlling said resistance switching means when the hoist approaches a stopping point.

14. A control system for hoists and the like comprising in combination, a variable voltage generator provided with a separately excited field winding, a differential series field winding and a shunt field winding, an electric hoist motor connected to be supplied from said generator, a reversing master switch having an off position and operating positions for controlling the polarity of said separately excited field winding to control the direction of rotation of said motor, means responsive to operation of said master switch for controlling the excitation of said shunt field winding to control the speed of said motor, limit switch mechanism responsive to rotation of said motor in one direction for controlling the excitation of said shunt field winding to control the speed of said motor as the hoist approaches a stopping point in one direction, an additional limit switch mechanism for controlling the excitation of said shunt field winding when said hoist approaches a stopping point in the opposite direction, one of said mechanisms being actuated by rotation of said motor in one direction to prepare said mechanism to respond to rotation of said motor in the opposite direction, and the other of said mechanisms being actuated by rotation in said opposite direction to prepare said other mechanism to respond to rotation in said one direction.

CLAUDE P. HAMILTON.